L. JOHNS.
CYCLE FRAME.
APPLICATION FILED FEB. 24, 1913.
1,109,230.
Patented Sept. 1, 1914.
2 SHEETS—SHEET 1.
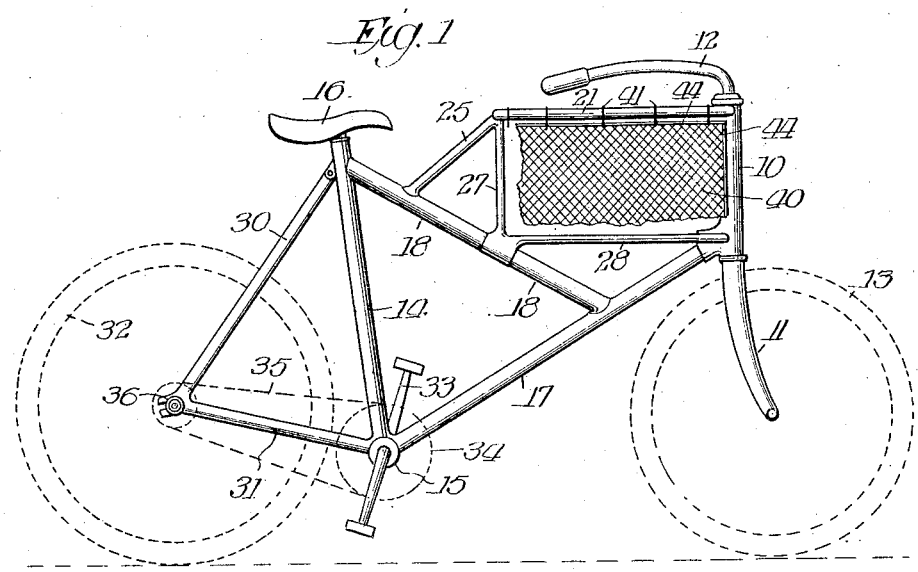
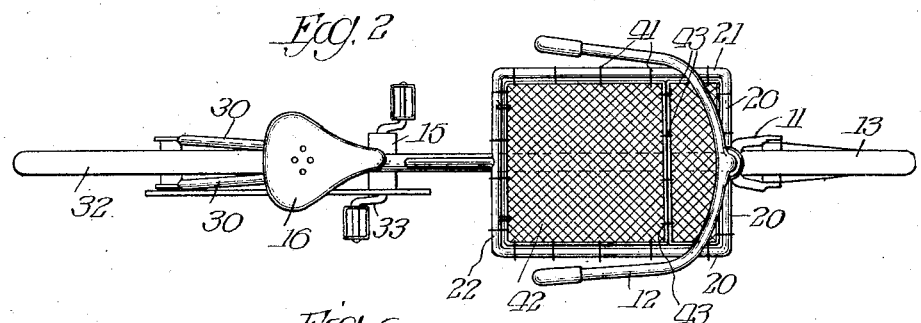
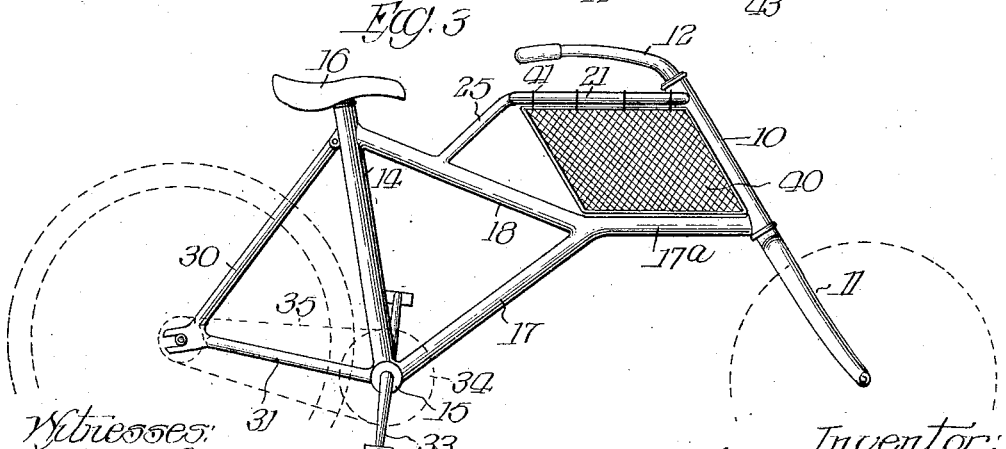

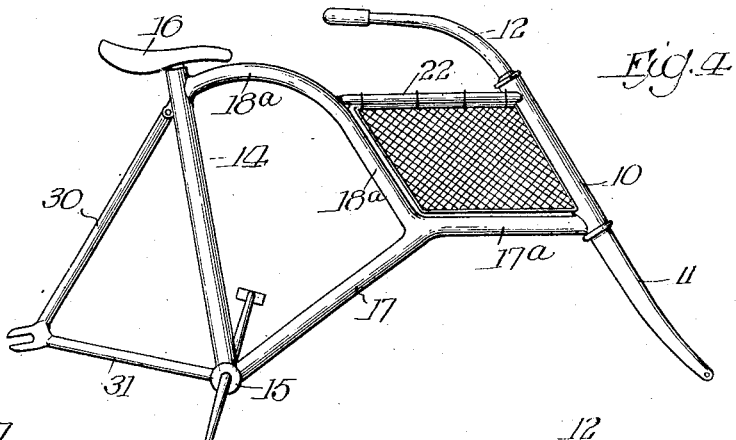
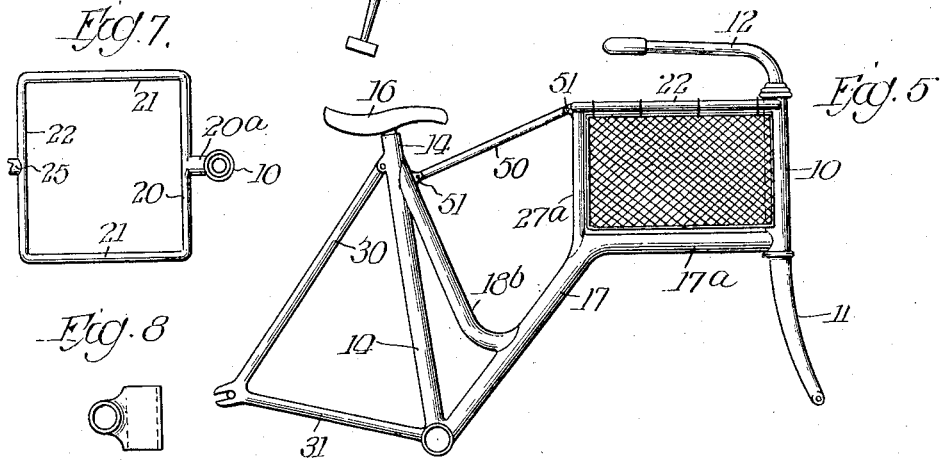
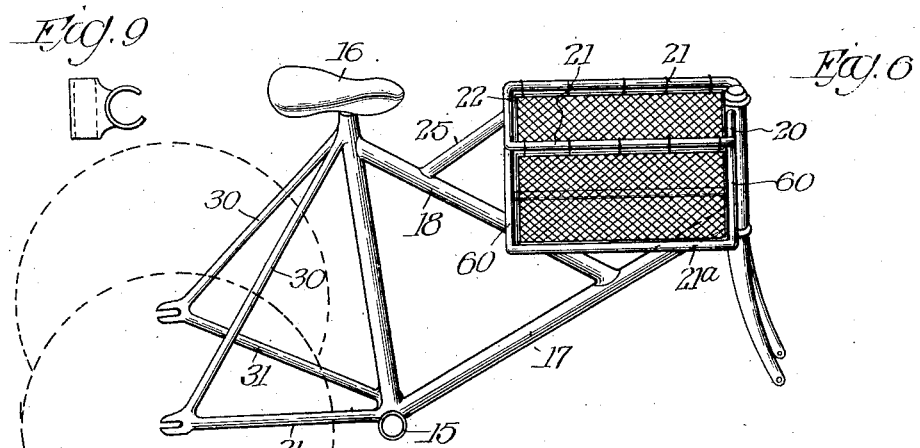

UNITED STATES PATENT OFFICE.

LUTHER JOHNS, OF OAK PARK, ILLINOIS.

CYCLE-FRAME.

1,109,230.　　　　　Specification of Letters Patent.　　　Patented Sept. 1, 1914.

Application filed February 24, 1913. Serial No. 750,079.

*To all whom it may concern:*

Be it known that I, LUTHER JOHNS, a citizen of the United States, residing at Oak Park, in the county of Cook and State of Illinois, have invented certain new and useful Improvements in Cycle-Frames, of which the following is a specification.

My invention relates to frames for bicycles, tricycles, and the like, and has more particular reference to frames of cycles adapted to the carrying of store parcels and similar articles.

The principal objects of my invention are to provide a frame which shall be strong and durable, well able to withstand the shocks to which such cycles are subjected; which shall permit of the carrying of considerable loads without straining the parts injuriously; and, in some constructions, to produce a shorter and more compact frame than is usual or heretofore considered possible in cycles of this type; in other constructions to provide a frame for what may be termed a lady's bicycle for use as in marketing; and in all forms, to combine rigidity and strength with cheapness of construction, lightness of parts, and attractiveness of design.

Other objects are to render more safe, cheap, satisfactory and attractive, the delivery of parcels by means of a bicycle or tricycle.

Still other objects will appear hereinafter.

I am aware that package-carrying bicycles have heretofore been suggested in which a loop member or package receptacle frame is located in essentially the same relative position in the frame as is illustrated in the drawings herewith, and I do not claim such loop element as original with me.

My present invention resides more particularly in the novel combination of such a package carrier frame with certain bracing elements and frame reaches, and in certain angular dispositions of various parts which I employ variously in various constructions for producing package-carrying cycles having the advantages hereinabove set forth.

In the accompanying drawings forming a part of this specification I have pictured several embodiments of my invention; but it is to be understood that these figures are illustrative only and are not intended to show all of the practical and useful types of frame which may be made in accordance with the improvements herein set forth.

In these drawings, Figure 1 is a side view of a package carrying bicycle having a frame embodying my invention in a preferred form; Fig. 2 is a top plan of the cycle shown in Fig. 1; Figs. 3, 4 and 5 are side views of modified forms of cycle frames containing my improvements; Fig. 6 is a perspective showing one adaptation of my improved frame to tricycle construction; Fig. 7 is a fragmentary top plan showing the loop element of the frame connected to the steering head by means of a short bar; Fig. 8 and Fig. 9 show respectively side and top views of a form of coupling which I have found suitable for connecting the loop element of the frame with the steering head.

Referring to Fig. 1, the steering head may be of the usual kind and is formed for the reception of a steering spindle, mounted therein in any approved manner and carrying the wheel fork 11 and the steering handle 12. A wheel 13, shown in diagram, is mounted to rotate between the arms of the fork 11. The seat post 14 carries a crank hanger 15 in the usual way, and also the customary saddle 16 at its upper end. The crank hanger being either integral with or secured to the seat post, I shall, for the purposes of this specification, consider the seat post and crank hanger as only one part, and may refer to these combined parts broadly as the seat post; thus in the description and claims the mentioning of a reach extending from the steering head to the seat post will be understood as describing and including a reach extending to the crank hanger.

Between the steering head and the seat post (or crank hanger) I provide the reach 17, the same being in rigid connection with the steering head and seat post. This bracing rod or reach may extend rearwardly in a direct line as in Figs. 1 and 6, or may proceed substantially horizontally for a space and then dip downwardly as in Figs. 3, 4 and 5, or it may have any suitable and appropriate line or lines of direction. This lower reach 17 is rigidly connected with the saddle post 14, preferably near the top of the latter by means of brace 18.

A package-carrying frame or loop member is provided preferably extending rearward from the top portion of the steering head 10, and is rigidly connected therewith, either by having its laterally extending arms or the front bar 20—20 of the frame united directly with the steering head or indirectly by means of a coupling, for instance as shown in Figs. 8 and 9, or through the agency of a short bar 20ª (see Fig. 7) which is rigidly connected with both the steering head and the front bars or bar 20—20 of the package-carrier frame. This package-carrier frame is preferably made rectangular in shape, in which form it is provided with the side members 21 and the rear member 22, these front, side and rear elements thereof being preferably formed integral with each other, although the same may be made separately and rigidly united at their ends. I prefer to have this package-carrier frame lie in a substantially horizontal plane as shown, although this is not essential. From a point substantially in the middle of the rear member 22 of this carrier frame I may extend a brace or connection 25 rearwardly and downwardly, this connection 25 being rigidly secured to the rear member 22 of the carrier frame and with the brace 18, or it may be integral with the loop. A light, substantially vertical bracing rod 27 may be provided between the brace 18 and the carrier-frame member 22 for heavy work, and also a brace 28 connected with the steering head, either directly or indirectly, (as by connecting it with the reach 17 as shown) and with the brace 18, although these elements 27 and 28 are not always required.

To the rear of the seat post I provide a forked support or wheel standard 30 connected at its upper end with the seat post by means of a bolt in the usual manner; and a lower forked bracing member 31 rigidly connected wtih the crank hanger 15 or saddle post 14 in the usual way and extending rearwardly therefrom and having its arms either integral or connected with the corresponding arms of the fork 31. A driving wheel 32 (shown in diagram) is mounted to rotate between the forks of the frames or standards 30 and 31, and may be mounted therebetween in any approved way. The crank hanger 15 is adapted to support rotatively the pedal cranks 33, on the shaft of which (not shown) may be mounted a sprocket 34 carrying the chain 35 passing over the sprocket 36 on the shaft of the rear wheel 32, all in a manner well known in the art. The sprockets and chain are also shown in diagrammatic form.

The package-carrier frame or loop is adapted to support a package-carrier 40, which may comprise a bottom, sides and ends of light sheet metal, composition or preferably, of wire fabric, and such package carrier may be secured to the loop member in any approved way, as by means of hooks or straps 41. A lid 42 covering all or part of the package receptacle 40 may be hinged as at 43 to some part of the package-carrier frame. If the package-carrier be made of light foraminous material, it is preferable to provide the same with marginal supporting rods 44.

In Fig. 3 I have illustrated a frame in which the main reach 17 has a portion 17ª substantially horizontal and adapted to support the bottom of the package receptacle 40. In this particular instance I have illustrated the steering head 10 as slanting forward at a considerable angle and have shown the same angular disposition of the rear wall of the package receptacle. By this arrangement the knees of the operator have greater freedom, and, if desired, a shorter frame may be provided.

In Fig. 4 I have shown the brace 18ª as extending upward from the lower reach 17—17ª to substantially the top of the package-carrier loop and thence curving to the rear and secured rigidly with the saddle post 14. In this construction the rear portion of the package-carrier frame is rigidly secured directly to the brace 18ª.

In Fig. 5 I have shown a form of frame in which the brace 18ᵇ is rigidly secured to the lower part of the reach 17—17ª and at its upper end to the saddle post 14, thus providing a frame having sufficient space between the seat post and the package-carrier to permit of the suitable operation of the cycle by a woman wearing the usual undivided skirts, should such use of the bicycle be found desirable. In this form I preferably provide an upstanding brace 27ª rigidly connected at the top with the carrier frame and at the bottom with the lower reach 17—17ª, and between the carrier frame and the brace 18ᵇ I preferably provide the link 50 connected to the parts last mentioned by means of bolts 51. This link 50 is provided to insure greater rigidity at such times as the cycle may be used by a man in the ordinary way, this form being thus readily convertible to different uses.

In the tricycle pictured in Fig. 6 the form of the rear forks or standards of the bicycle frames shown are well illustrated, but in this figure they are separated considerably beyond the requirements of the bicycle, and this in order to provide for two wheels at the rear, the wheels naturally being placed outside of the forks. In this figure I have also shown a rigid frame for the package carrier, comprising not only the upper members 20, 21 and 22 as in the other forms described, but also a lower frame of substantially the outline of the upper frame, one member of the lower frame, 21ª, being clearly shown, and the upper and lower frames being connected by corner pieces 60 so as to make a rigid frame. The lower frame may be rigidly attached to the steering head 10 and to the bracing member 18 at appropriate points.

My improved frame may be constructed by any approved method of making cycle frames, and of any suitable materials, all of which are well understood and known by those skilled in the art; but I prefer to employ light-weight tubular steel of the form, character and size commonly used for bicycle frames. Cycles provided with such frames respectively are used in the ordinary way, except that packages and other suitable articles may be placed, as is intended, within the receptacle carrier 40 and so transported conveniently from place to place. This frame may of course also be used in power-driven bicycles and the like.

While I have illustrated and described various embodiments of my improvements in cycle frames it will be apparent to those skilled in the art that changes may be made in the arrangement of parts and in the details of construction shown without departing from the spirit of my invention, and reference should be had to the appended claims to determine its scope.

I claim:

1. In a package carrying cycle frame, the combination of a steering head, a saddle post, a reach extending from the steering head to the saddle post, a brace extending from said reach to said saddle post, wheel supporting elements for the frame, and a package-carrier frame extending from said steering head and connected to said brace, substantially as described.

2. In a package carrying cycle frame, the combination of a steering head, a seat post, means connected with said seat post for supporting a wheel, a reach connecting said steering head and said seat post, a brace connecting said reach and said seat post, a package-carrier frame connected to said steering head, and a bracing element extending from said brace to said package-carrier frame.

3. In a package carrying cycle frame, the combination of a seat post, a forked supporting member extending rearwardly from said seat post, a bracing member connecting said forked supporting member and said seat post, a steering head, a reach connecting said steering head and said seat post, a brace connecting said reach and said seat post, a package-carrier frame connected to said steering head, and a connection between said carrier frame and said brace.

4. In a package carrying cycle, the combination of a seat post, a wheel standard, a steering head, a reach extending from said steering head to said seat post, a brace extending from said reach to said seat post, a package-carrier frame connected to said steering head, a connection between said carrier frame and said brace, and a package receptacle supported by said frame, the rear wall of said package receptacle forming an acute angle with the plane of the package-receptacle frame.

5. In a package-carrying cycle frame, the combination of a seat post, a steering head, a substantially Y-shaped structure having one leg thereof rigidly connected to said steering head and two legs thereof rigidly connected to said seat post, and a package-carrier frame rigidly connected to said steering head and to one of the legs of said Y-shaped structure connected to the seat post.

6. In a package-carrying cycle frame, the combination of a steering head, a saddle post, a substantially Y-shaped structure having one leg thereof rigidly connected to said steering head at one portion thereof and the other two legs rigidly connected to said saddle post, and a frame element rigidly connected to said steering head at another portion thereof spaced from said first mentioned portion, said frame element being so connected to another frame part that a frame-wrenching shock upon the upper portion of said saddle post toward said steering head will be communicated simultaneously through said frame element and legs of said Y-shaped structure to spaced apart portions of said steering head, said frame element having provisions adapted to support a package receptacle intermediate said steering head and saddle post.

LUTHER JOHNS.

Witnesses:
M. M. KRIESAND,
T. D. BUTLER.

Copies of this patent may be obtained for five cents each, by addressing the "Commissioner of Patents, Washington, D. C."